Dec. 15, 1964     F. G. BACK     3,161,719
PANCRATIC LENS SYSTEM RELAY

Filed Sept. 1, 1961     2 Sheets-Sheet 1

INVENTOR.
FRANK G. BACK
BY *Albert F. Kronman*
ATTORNEY

INVENTOR.
FRANK G. BACK
BY Albert F. Kronman
ATTORNEY

3,161,719
PANCRATIC LENS SYSTEM RELAY
Frank G. Back, Lattingtown, N.Y.
(55 Sea Cliff Ave., Glen Cove, N.Y.)
Filed Sept. 1, 1961, Ser. No. 135,638
1 Claim. (Cl. 88—57)

The present invention relates to a pancratic lens system and particularly to a lens system which will provide relatively large useable field angles and high quality imagery over a wide magnification range in terms of both resolution and contrast. Known pancratic lenses follow two basic types of varifocal systems in front of the aperture stop, which accomplish the change in magnification. These types however are equivalent in their function. There is thus no basic difference in overall performance whether as in one type positive elements (e.g. Back U.S. Patent No. 2,454,686) are employed or in the other type negative elements (e.g. Capstaff U.S. Patent No. 2,165,341) are moved relative to fixed dioptric components to achieve the change in focal length.

The overall performance of the pancratic lens depends to a great extent on the design of the system behind the aperture stop which is substantially fixed in relation to the image plane, and is commonly known as the "relay." The construction of this part of a pancratic lens in particular greatly affects the contrast and resolution of the final image.

The present invention which improves the performance of pancratic lenses, therefore concerns mainly the relay design of varifocal systems. Prior art relays designed for this purpose have generally been derivatives of photographic triplets, Tessar types or modified Gauss lenses. The new objectives according to the present invention are constructed in such a way that on the object side of the system are the varifocal components which, according to presently accepted nomenclature, will be called in sequence: Front Element, Variator, Erector, Compensator. The aperture stop is located close to the compensator. If no physical stop is provided the location of the optical stop is close to the compensator. The relay which produces the final real image is disposed between the stop and the image plane. The element or elements of the relay closest to the stop are of the greatest importance to the performance of the whole system. These elements (closest to the stop) are followed by another component of the relay assembly (proceeding in the direction toward the image plane) which, with its positive power, forms the final real image.

According to the invention the compensator or the last compensator element closest to the stop is followed by a multiple element component which consists of at least one dispersive lens and at least one collective meniscus; the latter follows the negative lens in such a way that the negative lens and meniscus combined have the shape of a meniscus with its strong exterior surfaces convex toward the image plane (see FIGURE 2). If it is desired to employ more lenses than this combined meniscus group near the aperture stop to improve the performance, it is practical to place an additional lens in front of the negative element i.e. between stop and the negative element. The previously mentioned collective meniscus following the negative lens in the direction of the image plane can be designed as a doublet or a triplet to achieve further improvement of image quality. This meniscus can enclose surfaces in its interior having differences either in radii and/or indices and/or dispersion. The important factor to be provided is the dioptric structure of this relay portion close to the stop as hereinafter more fully described. The present invention also includes further structural characteristics which will considerably improve the real image formed by these new components.

According to the present invention that portion of the relay close to the stop is constructed in such a way that the simple or composite positive meniscus following the negative lens (in the direction toward the image plane) on the one hand is bent in such a way that the sum of the absolute value of its two exterior radii is less than two and a half times the equivalent focal length of the total relay, and, on the other hand, said meniscus and the negative lens preceding it in the direction toward the stop enclose an air space shaped like a biconvex lens which acts optically as a dispersive element.

The power $\phi_4+\phi_5$ of the air lens formed by the surfaces $R_4$ and $R_5$ depends on whether there is a further element in front of the dispersive lens or not. If there is such an element 23 and if we call its power $\phi_{23}$ then this element influences the whole construction. According to the present invention the power $\phi_4+\phi_5$ of the dispersive lens plus 1.27 times the power $\phi_{23}$ of element 23 has to be such that $(1.27\ \phi_{23}+\phi_4+\phi_5)$ is more than $-0.55\Phi$ but less than $-2.55\Phi$ of the total relay. In other words the absolute value of this sum is more than 55% but less than 255% of the total power of the relay. It follows that in case element 23 has positive power the absolute value of this sum decreases, in case of a negative power of lens 23 it increases, because the power $\phi_4+\phi_5$ of the air lens is negative. The two conditions which in their combination form the main characteristics of the invention can be expressed as follows:

$$(/R_5/+/R_6/)<2.50F \tag{1}$$
$$0.55\Phi<(/1.27\phi_{23}+\phi_4+\phi_5/)<2.55\Phi \tag{2}$$

where $F$ and $\Phi$ are the equivalent focal length and the total power of the whole relay respectively. Condition two is valid also in cases where the element 23 is not used. In this case $\phi_{23}$ equals zero and thus the fulfilment of condition 2 depends solely on the absolute power of the air lens enclosed by the negative lens and the positive meniscus.

The relay according to the present invention features at the image end thereof a doublet 27 which encloses a pair of neighboring surfaces which can either be cemented or have unequal radii and therefore contain a lens shaped air space $a_7$ between them. Between this doublet 27 and the combined relay part situated near the stop there is a positive component 31 constructed in a manner known to the art which consists of one or preferably two collective elements 32, 33. This structure follows in its overall design known relay structures of proven practical value, but constitutes a progressive development over such devices. The new characteristics and their combinations not only improve the image quality considerably but also permit of a nearly optimal reduction in physical size of the total lens structure as well as of the dimensions of each lens element.

It has been found that the tangential and sagital field can be shaped favorably over the whole image field even for a wide magnification range by the structure of the collective meniscus positioned behind the negative lens close to the stop. This new construction is characterized by the fact that the absolute sum of the radii of the two outside surfaces 5, 6 (convex toward the image) is more than 45% but less than 115% of the equivalent focal length of the whole relay.

Expressed as an inequality:

$$0.45F<(/R_5/+/R_6/)<1.15F \tag{3}$$

This rule assigns to the two outside surfaces of the meniscus radii, which allow a strong influence on the skew image rays without leading to hemispheres which are hard to manufacture.

Such a meniscus, which has a great influence on the skew rays very often causes considerable undercorrection of spherical aberration which may cause a drop in image quality. This, and other similar reductions in image quality are offset by another characteristic of the present invention, namely that the radius of the strongly curved front surface 3 of the negative lens 20 which is concave toward the stop, has an absolute length between 13.75% and 27.50% of the equivalent focal length of the total relay. Or expressed as a formula:

$$0.1375F < /R_3/ < 0.2750F \qquad (4)$$

In order to achieve sufficient sharpness over a relatively wide field the power $\phi_{21}$ of the positive compound or simple meniscus 21, which follows this negative lens 20 has to be more than ⅔ of the power of the total relay. At the same time the absolute value of the sum of surface powers which precede the last collective surface 6 of this meniscus, starting behind the aperture stop, shall be such that their total power is more than 3/2 times the equivalent focal length of the total relay. These two conditions written as a formula are:

$$\phi_{21} > \frac{2}{3} \Phi \qquad (5)$$

$$\sum_{i=0}^{5} /\phi_i / > \frac{3}{2} \Phi \qquad (6)$$

wherein $\Phi$ is again the total power of the whole relay and where $\phi_0$ is the power of the surface closest to the stop or the compensator respectively and where $\phi_5$ is the power of the dispersive front surface of the positive meniscus.

As mentioned before the portion of the relay close to the stop is followed (in the direction toward the image) by a collective system which preferably consists of a pair of positive lenses 32, 33. Thereby the required positive power is distributed over a larger number of surfaces. This arrangement decreases the aberration contributions of each surface, as is well known in the art. Thus in a simple way good imagery is achieved even for a high relative aperture. Furthermore, according to the present invention, the two positive lenses 32, 33, between the relay parts closest to the stop and closest to the image enclose a pair of neighboring surfaces 8 and 9, the sum of the whole refractive powers $\phi_{8+9}$ is more than 175% but less than 425% of the equivalent power of the whole relay which can be expressed as a formula:

$$1.75\Phi < \phi_{8+9} < 4.25\Phi \qquad (7)$$

The effect of this arrangement is further improved when the combined power of these two positive lenses 32, 33, i.e. the total sum of its surface powers $\phi_{32} + \phi_{33}$ is more than twice but less than four times the equivalent power of the whole relay. Or as a formula:

$$2.00\Phi < \phi_{31} < 4.00\Phi \qquad (8)$$

wherein $\phi_{31}$ is the sum of all surface powers of the positive lens component 31.

The doublet 27 on the image end of the relay is of asymmetrical design and consists preferably of the two lenses 29, 30, of opposite power which enclose a pair of adjacent inner surfaces 12, 13, with differences in indices and/or dispersion and/or radii as is well known in the art. If this pair of adjacent surfaces 12, 13, has equal curvature of equal sign the doublet can be cemented. If cemented these adjacent surfaces 12, 13, are effective only by the difference of indices and/or dispersion. By introduction of the aforementioned difference in radii a greater dioptic effect can be achieved in the interior of this doublet 27. According to the present invention the absolute sum of the powers $\phi_{12} + \phi_{13}$ of these adjacent surfaces 12, 13, shall be more than 5% but less than 75% of the total power of the relay 12. Thus:

$$0.05\Phi < /\phi_{12} + \phi_{13} / < 0.75\Phi \qquad (9)$$

The invention consists of the construction, combination and arrangement of parts, as herein illustrated, described and claimed.

In the accompanying drawings, forming a part hereof are illustrated several embodiments of the invention and in which drawings similar reference characters designate corresponding parts, and in which.

Figure 1:
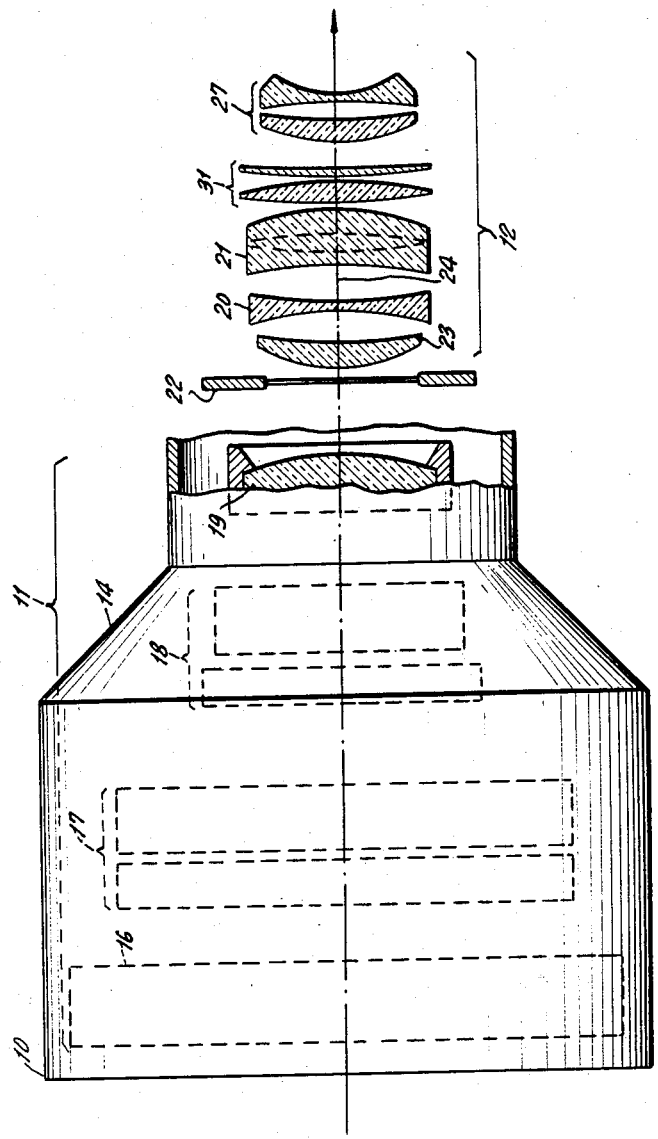
FIGURE 1 is a view partly in longitudinal section of a complete optically compensated varifocal system according to the present invention with certain elements indicated in dashed lines.
Figure 2:
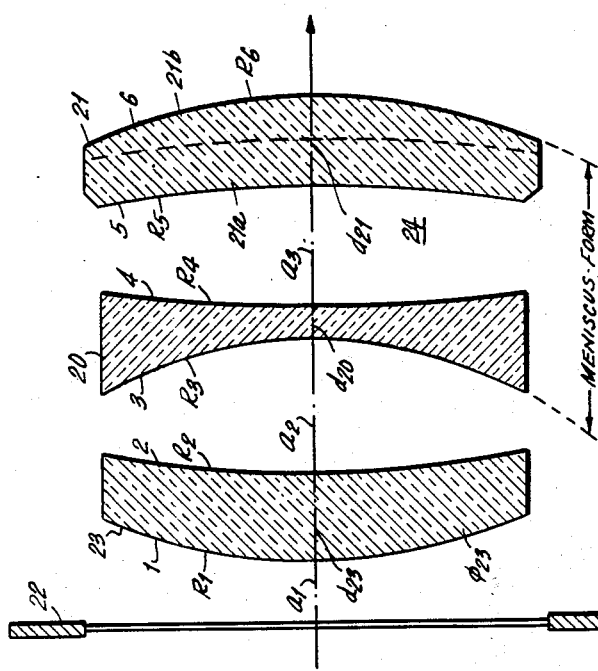
FIGURE 2 is a view in longitudinal section somewhat enlarged of a portion of the relay lens system shown in FIGURE 1 illustrating the various powers, radii and air spaces between the lenses.

Referring to the drawings and particularly to FIGURE 1, 11, is the varifocal part of the pancratic system in which the inner lens groups with their mounts 16, 17, 18, 19, are shown in phantom view. On the side close to the aperture stop 22 the varifocal system 11 contains as its rearmost component the compensator element 19. This varifocal system is followed by the aperture stop 22 and the relay portion 23, 20, 21, close to the stop. As shown in FIGURE 2 the radii of the elements which face the object side are called $R_1$, $R_3$, $R_5$, while the radii facing the image are called $R_2$, $R_4$, $R_6$. The thickness of these lenses 23, 20, 21, are called $d_{23}$, $d_{20}$, $d_{21}$, and the two latter ones with their adjacent surfaces 4, 5, enclose a dispersive biconvex air lens 24 with an axial thickness of $a_3$ and power $\phi_{4+5}$. The distance between the stop and the vertex of the closest lens element is called $a_1$ while the axial distance preceding the dispersive surface $R_3$ is called $a_2$. If the relay structure does not use the lens element 23 then $a_1$ and $a_2$ are identical. The lens groups 20 and 21 (which latter is shown in FIGURE 1 with dotted inner radii as a triplet to show the possible variations) form together a meniscus with an outside surface concave towards the object. If the positive meniscus 21 is constructed as a doublet its two members are called $21_a$ and $21_b$ (FIG. 2).

Figure 3:
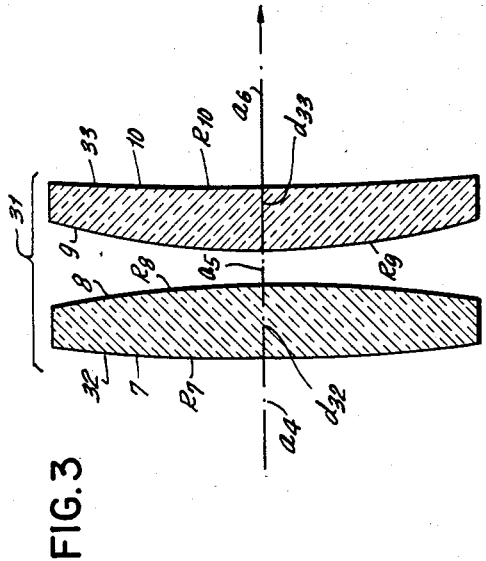
FIGURE 3 is a view similar to FIGURE 2 showing the two positive lens elements shown in the relay of FIGURE 1.

The relay portion closest to the stop is followed by an intermediate component 31 which is shown in FIGURE 3 in detail. This assembly consists of two collective elements 32, 33, with their surface radii indicated at $R_7$, $R_8$ and $R_9$, $R_{10}$. The distance of the front surface $R_7$ from the rear surface $R_6$, of the preceding meniscus is shown as $a_4$, in FIGURE 3. The axial distance between the two elements 32, 33, is $a_5$. The sum of the positive powers of the two surfaces adjoining this axial distance is $\phi_{8+9}$ and the total power of the whole component 31 is $\phi_{31}$.

Figure 4:
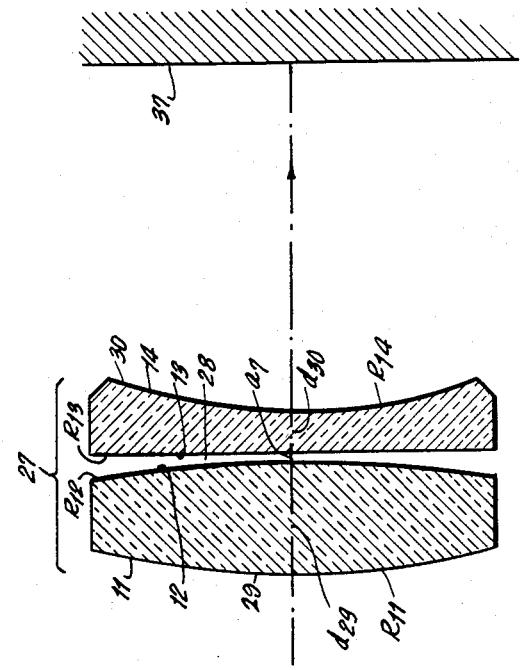
FIGURE 4 is a view similar to FIGURES 2 and 3, showing the last doublet of the relay illustrated in FIGURE 1.

Behind the rear surface $10_{10}$ in the direction toward the image at a distance $a_6$ is the doublet 27 whose construction is best shown in FIGURE 4. The symbols for this doublet are chosen analogous to those of the preceding components. Thus the radii in their proper order towards the image are called $R_{11}$, $R_{12}$, $R_{13}$, $R_{14}$, for the lenses 29 and 30. The lens thicknesses and the enclosed air gap 28 are called accordingly $d_{29}$, $a_7$, and $d_{30}$. The sum of the powers of the inside neighboring surfaces 12, 13, is called $\phi_{12+13}$ and finally the image plane of the whole system is shown at 37 in FIGURE 4.

In the following table which uses the same symbols as the drawings, the radii, thickness, and distances (the latter two measured along the optical axis) are given for an equivalent focal length of the total relay of $F = 100.0$ mm. The glasses used in this example are characterized by their symbols of the Schott Glass Catalog, refractive indices (N) and by the Abbé number V for their dispersion.

EXAMPLE $[f = 100.0 \text{ mm.}]$

| Lens No. | Radius (R) mm. | Thickness $d$ and air space $a$ | Glass | Index $N_D$ | Dispersion V |
|---|---|---|---|---|---|
| 20 | $R_3 = -20.755$ $R_4 = +617.66$ | $a_1 \equiv a_2 = 3.670$ $d_{20} = 1.294$ $a_3 = 4.745$ | LaK-14 | 1.6968 | 55.6 |
| 21 | $R_5 = -47.446$ $R_6 = -22.153$ | $d_{21} = 3.192$ $a_4 = 0.345$ | F-2 | 1.6200 | 36.3 |
| 32 | $R_7 = +387.89$ $R_8 = -62.163$ | $d_{32} = 2.588$ $a_5 = 1.380$ | BaF-7 | 1.6080 | 46.2 |
| 33 | $R_9 = +33.505$ $R_{10} = +253.92$ | $d_{33} = 3.364$ $a_6 = 2.243$ | SK-16 | 1.6204 | 60.3 |
| 29 | $R_{11} = +32.997$ $R_{12} = -152.88$ | $d_{29} = 4.313$ $a_7 = 0.086$ | SK-16 | 1.6204 | 20.3 |
| 30 | $R_{13} = \pm$ plan $R_{14} = +20.255$ | $d_{30} = 1.725$ | SFS-5 | 1.7618 | 27.0 |

Lak = Lanthanum Crown; F = Flint; BaF = Barium Flint; SK = Dens Crown; SFS = Special Dense Flint.

This relay is computed for a speed of F:2.7 and it has in accordance with inequality (1) and (3)

$$/R_5/ = 47.446$$
$$+$$
$$/R_6/ = \frac{22.153}{69.599} = 0.69599F$$

Thus this amount is not only smaller than 2.5F but it also lies between the limit of 45% and 115% of the equivalent focal length of this relay. Furthermore the absolute value of $R_3 = 20.75\%$ of the focal length of the relay and thereby lies between 0.1375F and 0.2750F which fulfills condition (4).

The above example has omitted the use of lens 23 for reasons of simplicity. In this case the axial distance $a_2$ to the front surface of the dispersive lens is therefore identical with the distance $a_1$ from the aperture stop to the first surface.

The doublet 27 close to the image has been chosen in such a way that the enclosed neighboring surfaces 12, 13, of this element form an air lens 28 with particularly high power, in the present example more than 40% of the total power of the whole relay. For the several lens elements customary glass types have been used which yield an improved image. By using special glasses the image quality can be still further improved. It is to be understood that the relay portion, which forms the real image can also be used successfully for other image forming tasks. In particular it can be shown that by using special lens materials which are transparent for ultra-violet or infra-red rays these systems can be used in the field of invisible light.

The following table shows again the refractive surface powers and their sums. It can be seen in particular that for the positive middle component 31 two elements are used with adjoining surfaces whose total power with $2.8297\Phi$ is even greater than the total power of this positive lens pair which is only 2.7421 times the total equivalent power of the relay. It can be seen furthermore that in the preceding example a median value within the range of condition 2 has been chosen. Finally, this table lists all dimensions which characterize the present invention again separately in the order in which they are used in the following claim. The relative value of the total power $\Phi$ of the relay is +10 diopters.

Table of Power $\phi_3 = -3.35719\Phi$     $\phi_9 = +1.85164\Phi$
$\phi_4 = -0.11281\Phi$     $\phi_{10} = -0.24433\Phi$
$\phi_5 = -1.30675\Phi$     $\phi_{11} = +1.88020\Phi$
$\phi_6 = +2.79872\Phi$     $\phi_{12} = +0.40581\Phi$
$\phi_7 = +0.15674\Phi$     $\phi_{13} = +0.00000\Phi$
$\phi_8 = +0.97808\Phi$     $\phi_{14} = -3.76103\Phi$ It is $\phi_{23} = 0$ and therefore according to condition 2, $$/\phi_4/ + /\phi_5/ = 1.41956\Phi$$

Furthermore according to condition 5, $$\phi_{21} = \phi_5 + \phi_6 = +1.49197\Phi$$

also according to condition 6, $$\sum_{i=0}^{5} /\phi_i/ = /\phi_3 + \phi_4 + \phi_5/ = 4.77675\Phi$$

which is indisputably larger than $1.50\Phi$.

Furthermore according to condition 7, $$\phi_8 + \phi_9 = +2.82972\Phi$$

and according to condition 8 the sum of all the surface powers of this positive component 31 is $\phi_{31} = +2.74213\Phi$.

Finally $\phi_{27} = \phi_{29} + \phi_{30} = +0.40581\Phi$ and lies thus between 5% and 75% of the total relay power $\Phi$ and thereby fulfills condition 9.

Having thus fully described the invention, what is claimed as new and desired to be secured by Letters Patent of the United States, is:

A pancratic lens assembly comprising in the order of the direction of the incident light, a front section, a series of fixed and axially movable lens elements in the front section to vary the field, a diaphragm behind the front section, a multielement relay behind the diaphragm of collective power adapted to form the final image, said relay comprising at least one negative lens, and at least one positive meniscus lens, said positive and negative lenses together forming a meniscus element having its external surfaces concave towards the incident light and in which the lenses have the following optical characteristics wherein $N_D$ is the refractive index for D line, V is Abbe's dispersion number, LaK is Lanthanum Crown, F is Flint, BaF is Barium Flint, SK is Dense Crown, SFS is Special Dense Flint, $R_3$, to $R_{14}$, are the respective radii of the refracting lens surfaces, numbered from the front to the rear of the lens system, $d_{20}$ to $d_{33}$ are the respective axial thicknesses and $a_3$ to $a_7$ are the respective axial separations from the front to rear of the lens system:

$[f = 100.0$ mm. (10 diopters)$]$

| Lens No. | Radius (R) mm. | Thickness $d$ and air space $a$ | Glass | Index $N_D$ | Dispersion V |
|---|---|---|---|---|---|
| 20 | $R_3 = -20.755$ $R_4 = +617.66$ | $a_1 \equiv a_2 = 3.670$ $d_{20} = 1.294$ $a_3 = 4.745$ | LaK-14 | 1.6968 | 55.6 |
| 21 | $R_5 = -47.446$ $R_6 = -22.153$ | $d_{21} = 3.192$ $a_4 = 0.345$ | F-2 | 1.6200 | 36.3 |
| 32 | $R_7 = +387.89$ $R_8 = -62.163$ | $d_{32} = 2.588$ $a_5 = 1.380$ | BaF-7 | 1.6080 | 46.2 |
| 33 | $R_9 = +33.505$ $R_{10} = +253.92$ | $d_{33} = 3.364$ $a_6 = 2.243$ | SK-16 | 1.6204 | 60.3 |
| 29 | $R_{11} = +32.997$ $R_{12} = -152.88$ | $d_{29} = 4.313$ $a_7 = 0.086$ | SK-16 | 1.6204 | 20.3 |
| 30 | $R_{13} = \pm$plano $R_{14} = +20.255$ | $d_{30} = 1.725$ | SFS-5 | 1.7618 | 27.0 |

References Cited by the Examiner

UNITED STATES PATENTS 3,014,406   12/61   Back ———————————— 88—57

JEWELL H. PEDERSEN, *Primary Examiner.*

EMIL G. ANDERSON, *Examiner.*